… … …

United States Patent Office 2,979,419
Patented Apr. 11, 1961

2,979,419

PROCESS FOR UPGRADING ARTICLES PREPARED FROM MONOALKENYL AROMATIC POLYMERS

Richard L. Hill and William R. R. Park, Midland, Mich., assignors to The Dow Chemical Company, Midland, Mich., a corporation of Delaware No Drawing. Filed Aug. 28, 1958, Ser. No. 757,661

18 Claims. (Cl. 117—72)

This invention relates to a process for upgrading thermoplastic moldings, extrudates, and other articles which have been fabricated from monoalkenyl aromatic polymers. More particularly it relates to such a process for improving the barrier properties and for increasing the solubility resistance of such articles.

A flow diagram of the instant process follows:

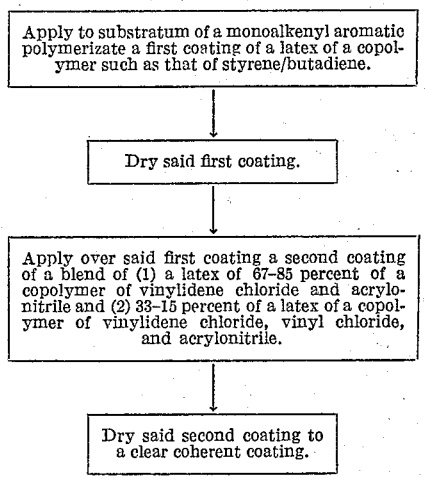

The monoalkenyl aromatic polymers, of which polystyrene is best known and most widely used, are noted for their low cost, easy fabrication into a variety of shapes, and for their wide range of desirable properties. Thus, these polymers have been fabricated into thin, flexible films and foils, as well as semi-rigid sheets, and moldings of thick section and complicated shape. The flexible films and foils made from such polymeric materials have exceptional clarity, and are adequate in most other properties to indicate a potential in the packaging field. However, such films and foils are high in moisture vapor transmission or permeability so that the materials cannot even be considered for many packaging applications, such as the packaging of hygroscopic materials, or those which require a retention of moisture. Such films as commonly prepared are oriented and in any modification of the films that orientation should remain substantially unaltered if the valuable film properties are to be preserved. In addition to retention of orientation the modification of such films and foils is complicated by their thermoplasticity, which precludes melt coating on practical grounds, and also by their poor solvent resistance in aromatic compounds, such as toluene, and the like, which are the common vehicles in lacquers and similar coating compositions.

The requirements of a useful coating for films and foils of polystyrene and the like are diverse and many. In addition to having a capacity for serving its intended function of lowering the permeability of the foils it must be continuously adherent to the substratum, it usually must not disturb the clarity or appearance of the substratum, it must have at least about the same or greater elongation as the substratum to prevent coating fracture when bent about edges or corners, and it should also have about the same resilience, toughness, and other physical properties as the substratum. The coatings that are applicable for use with, for example, the films and foils of regenerated cellulose have been found to be unsatisfactory for coating polystyrene from a viewpoint of adherence. When these coating compositions have been modified to improve their adherence, the modification has resulted in a serious blocking tendency. By blocking tendency is meant a reluctance to separation of two contacting surfaces. Thus the problems involved in upgrading thermoplastic articles, particularly those fabricated from the polymers of monoalkenyl aromatic monomers, are manifold and varied and it is extremely difficult if not impossible to predict the effectiveness of any given coating with any given class of substrata.

Accordingly it is the principal object of this invention to provide a process for upgrading articles made from monoalkenyl aromatic polymers.

It is a further object to provide such a process which will improve the solvent resistance and barrier properties of such articles.

A still further object is the provision of such a process which may be carried out upon the fabricated article without change or distortion of its shape or reduction of its structural properties. A related object is the provision of a process which may be carried out upon an intermediate form, such as a sheet, which may subsequently be given final shaping as by vacuum drawing or the like.

Still another object is the provision of such a process which utilizes aqueous latex dispersions and requires only simple equipment.

An allied object is the provision of the articles resulting from the process, with said article characterized in particular by improved barrier properties and solvent resistance and by having a low blocking tendency.

The above objects as well as associated and related objects, which will be apparent as the description proceeds, are accomplished by means of a process consisting essentially of the sequential steps of (1) applying to the article a first continuous adherent coating of a film-forming latex of a copolymer of a monoalkenyl aromatic monomer and a conjugated diolefin, (2) drying said coating, (3) applying as a second continuous coating, adherent to said first continuous coating, a film-forming dispersion of a blend consisting essentially of (a) from about 67 to 85 percent by weight of a first aqueous latex of a copolymer of vinylidene chloride and acrylonitrile; (b) from about 15 to 33 percent by weight of a second aqueous latex of a ternary polymer of vinylidene chloride, vinyl chloride, and acrylonitrile; and (c) from 0 to about 4 percent by weight based on the latex solids of (a) and (b) of a wax dispersion; and (4) drying and fusing said second continuous coating. The invention likewise contemplates the coated articles so prepared.

The films which are contemplated as subject materials for use in the process of this invention are those flexible films and foils as well as semi-rigid and rigid articles prepared from polystyrene and other alkenyl aromatic polymers containing at least 50 percent by weight of a monoalkenyl aromatic monomer having from 6 to 10 carbon atoms in the aryl nucleus. By such monoalkenyl aromatic polymers and copolymers it is intended to include the resinous thermoplastic materials resulting from the polymerization of monovinyl aromatic monomers, such as paramethyl styrene, meta-ethyl styrene, ortho-para-dimethyl styrene, ortho-para-diethyl styrene, para-chlorostyrene, isopropyl styrene, ortho-methyl-para-isopropyl styrene, and ortho-para-dichlorostyrene, and also those materials resulting from the copolymerization of styrene with alpha-methyl styrene or with one or more of any of the above named compounds. Thermoplastic copolymerizates of styrene or of the other aforementioned compounds with other monoethylenically unsaturated monomers, such as acrylonitrile, may also be used. The term "monoalkenyl aromatic polymer" as used herein is intended to include the thermoplastic polymers and copolymers of monoalkenyl aromatic compounds having the alkenyl radical directly attached to a carbon atom of an aromatic nucleus which compounds may also contain one or more alkyl or halogen atoms as nuclear substituents.

Flexible films may be prepared from the above described thermoplastic materials by thermal fabrication, specifically thermal extrusion. Processes, techniques, and apparatuses for such fabrication are known. Other techniques include the solvent casting or dipping of the compositions from a volatile solvent followed by evaporation of that solvent. As prepared such films must be oriented for flexibility. Unoriented films are so brittle and weak in other properties as to have no commercial utility in packaging or similar uses. Flexible films of these polymerizates of monoalkenyl aromatic monomers may be prepared in a variety of gauges, thicknesses, colors, and widths. Since the modifications contemplated by this invention involve primarily surface phenomena, they are adaptable to any size, shape or thickness where uniform coatings may be applied. The modifications are useful with moldings, extrusions, or any other thick section of a rigid or semi-rigid nature. The process results in advantages as will be described. Thus, it is not intended to limit the process or the resulting articles to any particular shape.

The process consists essentially of the application of two separate coatings in consecutive sequence to the thermoplastic substratum. The first coating is of a film-forming latex of a styrene-butadiene copolymer. Such latexes are sold commercially. As sold the copolymeric component of such latexes is composed of from about 20 to about 70 percent by weight of styrene with the remainder made up of butadiene. It is imperative that any of the coating materials employed in this process should have at least about the same flexibility and elongation as the substratum. Otherwise the coating would crack or split or the article would be damaged in other manner every time a lateral stress was exerted on the article. Such stresses are commonplace in packaging irregularly shaped objects and in packaging with the high speed equipment of the present day. When the copolymer contains appreciably more than about 70 percent styrene the latexes are usually not film forming by simple deposition and when coatings are prepared by special techniques, the resultant coating is too brittle for use herein. When the coating contains appreciably less than 20 percent styrene the coatings lose considerable of their adhesive power and are thus unsuitable for use herein.

The term styrene-butadiene latex has been employed above for ease of description. It is intended that the invention include film-forming latexes generally of a copolymer of any monoalkenyl aromatic monomer, as defined supra for the operable substrata, and a conjugated diolefin, such as butadiene and the lower alkyl substituted butadienes. Such polymeric materials will usually follow the compositional characteristics previously mentioned for the styrene-butadiene latexes.

As indicated such latexes are rather generally available. If other latex is desired it may be easily prepared by known emulsion polymerization techniques. As is well known in that art, many considerations besides copolymer composition enter into the film formability of any latex. Chief among those considerations are particle size distribution and polymeric solids content. It is usually true that a latex should have a particle size distribution of about 2000 Angstrom units or less if film formability by simple deposition is to be attained. Additionally, the latex should contain a minimum of at least about 20 percent by weight of polymeric solids to be film forming. Methods and techniques for obtaining such requisite characteristics are known.

The second essential coating is deposited from a blend of two different latexes in proportions and of a composition as will be defined and a wax dispersion. The first latex of the blend is of a copolymer of vinylidene chloride and acrylonitrile. Although any of these polymeric materials consisting predominantly of vinylidene chloride may be used, it is preferred to use those containing from about 70 to about 90 percent by weight of vinylidene chloride with the remainder made up predominantly of acrylonitrile. The polymeric materials of this preferred composition exhibit properties, such as low moisture vapor transmission, toughness, clarity, elongation, inertness to solvents and the like, that make them peculiarly well adapted for use in the applications contemplated herein. When less than 70 percent by weight of vinylidene chloride is used, it is done at a sacrifice of some of the above named properties and in addition in a reduction of block resistance. The polymeric material should contain at least 10 percent by weight of acrylonitrile. Those copolymers containing significantly less than about 10 percent acrylonitrile are brittle and hard and require excessive concentrations of plasticizers to achieve film formability.

The second latex of the blend is of a ternary polymer of vinylidene chloride, vinyl chloride, and an alkyl acrylate. Although any of the polymers of that monomeric composition may be employed, it is preferred to employ those containing at least about 70 percent by weight of vinylidene chloride with the remainder made up of predominantly of vinyl chloride. Ternary polymers of that preferred composition exhibit properties, such as those described supra for the vinylidene chloride-acrylonitrile copolymers, that make them peculiarly well adapted for use in the herein claimed blends. Although less than 70 percent by weight vinylidene chloride may be use, it is done at a sacrifice of most of the above-named properties, and especially of the block resistance. The acrylate is used to internally plasticize or to soften the polymeric material to enhance the latex film-forming ability and to improve the adhesion of the coating to the first coating. This will usually be achieved with 10 percent by weight or less of the acrylate. When significantly more than 10 percent by weight of acrylate ester is used, the resulting coating does not have the optimum properties for use in packaging. The efficiency of any acrylate in that function is determined principally by the length and chain structure of the alkyl ester group. It is usually true that the greater the bulk of the ester group, the greater will be the plasticization tendency of that ester when employed as herein described. The optimum concentration of copolymerized acrylate within the stated limits may be easily determined by simple preliminary experiment. The remainder of the polymeric material is conveniently composed of vinyl chloride or vinyl acetate.

An example of a useful latex is one prepared by the emulsion polymerization of 75 percent vinylidene chloride, 20 percent vinyl chloride and 5 percent ethyl acrylate.

As with the styrene-butadiene latexes, many of the latexes useful for the second coating will be commercially available. If desired they may be prepared by the emulsion polymerization of the appropriate monomers.

The second essential coating preferably contains a wax as an additional element to the above latex blend. Waxes suitable for the compositions are those having a melting point of at least 60° C. and preferably from about 60° C. to about 100° C. Those with lower melting points cause the coated films to block. Typical representatives of such waxes are those of the following groups: (a) the true waxes, i.e., the esters of high molecular weight monohydric alcohols and higher fatty acids, examples of which are spermaceti, carnauba, montan, beeswax, japan wax, Chinese insect wax, etc.; (b) synthetic esters of polyhydric alcohols with the higher fatty acids, e.g., 12-hydroxy stearin, glycol stearate, diethylene glycol laurate, etc.; (c) high melting point fats, such as tallow (ordinarily used in conjunction with one of the other types); (d) synthetic esters of monohydric alcohols with the higher fatty acids, e.g., phenoxy ethyl stearate, lauryloxyethyl laurate, palmitic and stearic esters of the alcohols obtained by reducing palm or sperm oil fatty acids; (e) monohydric alcohols from the hydrogenation of natural oil fatty acids; and (f) monohydric alcohols from the saponification of waxes, such as myricyl alcohol, cetyl alcohol, and ceryl alcohol. The preferred wax is carnauba wax.

The ingredients forming the film-forming dispersion of the second essential coating should be employed in certain definite proportions. It has been found that successful upgrading of the articles is attained when the vinylidene chloride-acrylonitrile latex solids constitute from about 67 to 85 percent by weight of the dispersion solids, and the ternary latex solids constitute a complementary amount of from about 33 to 15 percent by weight of dispersion solids. The vinylidene chloride-acrylonitrile latex does not form a clear, fused, film below the heat distortion temperature of polystyrene film or of articles prepared from most of the other monoalkenyl aromatic polymers. The latex of the ternary polymer will form such a film but in so doing results in a surface which blocks severely at 60° C. Only when each latex is used in the indicated proportion is a satisfactory coating having the desired properties obtained. When a wax is employed as in the preferred composition it should not exceed about 4 percent of the dispersion solids. In this range of concentration it greatly reduces the blocking tendency. However, when present in amount significantly greater than about 4 percent, the presence of the wax adversely affects the film clarity. The block temperature mentioned above is the minimum temperature at which two surfaces of film in face to face contact will not slip apart when placed under an applied pressure for a time which is arbitrarily selected. The block temperature is of significance when the film is rolled up on itself and is shipped and stored in such manner. Likewise after conversion to bags and pouches the block temperature assumes an importance not only in shipping and storing, but also in feeding into package filling apparatus. For most commercial applications it has been found that this block temperature should be at least 60° C. when placed under an applied pressure of 1 pound per square inch for 24 hours.

Each of the coatings of this process may be applied by known coating techniques, including brushing, spraying, roller coating, dipping, or other means. To maintain uniform, reproducible properties and characteristics it is essential that each coating be of substantially uniform thickness. Thus, after application or simultaneously therewith, but before drying, of the latex in each instance there may be used known doctoring means, such as a doctor blade, squeeze rolls, or a planiform stream of air commonly referred to as an air knife, to remove excess latex. A convenient technique is to allow the excess latex to drain off the coated article. For many applications this will provide adequate uniformity of coating thickness.

After each coating application the coating is dried and fused into a continuous coherent coating. That drying may occur at room temperature, although it is preferred to employ slightly elevated temperatures of 60° to 85° C. which appreciably shorten the drying step. Temperatures which are significantly higher than 85° C. should usually be avoided, since they tend to distort the shape or in some instances may destroy or at least alter the orientation and other properties and characteristics of the substratum.

To achieve good barrier properties, solvent resistance, and other desirable properties it is only necessary that each of the dried coatings completely and coherently cover the surface to be coated. As a practical matter such coatings will, if conventional coating techniques are followed, be of a thickness of combined coating of at least 0.0001 inch per side. Coatings which are greater than about 0.05 inch are difficult to dry without special apparatus and methods, and impart little or no significant improvement in properties over the less thick coatings. Accordingly, it is preferred to have the combined coatings of a thickness of from about 0.0001 to 0.05 inch.

The articles prepared in accordance with this invention have the functional advantages of laminate-like structures. Thus, the strength, toughness, flexibility and other like properties of the coated article are determined mainly by the substratum. Other properties, such as heat sealability, barrier characteristics, and solubility, are determined by the second coating. The first or base coating functions to maintain the second coating and substratum in continuous adherent relationship. Thus, both the composition of each coating and their sequence of application are critical to the success of the process. The materials described herein as useful for first coatings will adhere to the substratum, but provide little additional increase in barrier properties of solvent resistance. In addition these materials exhibit prohibitively low blocking temperatures causing difficulties in storage. For example a polystyrene film coated with a dried, fused coating of a styrene-butadiene latex of the type herein described will have a great tendency to adhere to itself when wound in rolls. Similarly sheets treated in the same manner tend to stick together when stacked. Those articles will be very difficult to separate without causing severe impairment of the coating.

The materials described as useful for the second coating are not capable of continuous adherence to the substrata contemplated in this invention. Continuous adherence has been found only when the second coating is applied over the first coatings. It has been averred in the prior art that certain surface treatments, such as chlorination, scrubbing, heating to slightly elevated temperatures prior to coating, and precoating with solvents, plasticizers and wetting agents, which when applied to the unmodified substratum will improve the adhesion of subsequently applied coatings and laminae. Additionally it has been suggested that the incorporation of solvents, wetting agents, and the like, into the coating composition will result in improved adhesion of the coating to the substratum. None of these latter techniques, however, resulted in satisfactory adhesion of the second coating to the articles which lacked the first coating. It was further found that when the latexes of each coating were blended and that blend applied to the article that the block temperature remained low, and that the adhesion and other properties were erratic and unreproducible.

The articles may be treated in accordance with this invention on either one or all surfaces depending upon the end use for which the article is to be employed. The articles after treatment may have impressions printed or stamped thereon usually without affecting the barrier, heat sealability, or other properties. Also coated flexible films and foils may be used with conventional wrapping and packaging machinery without serious effect on the coating.

The operation of the process and the advantages thereof will be more apparent from the following illustrative examples wherein all parts and percentages are by weight unless otherwise indicated.

Example 1

A sample of multi-laterally oriented polystyrene film of a thickness of about 0.001 inch was coated with a film-forming latex of 60 percent styrene and 40 percent butadiene. The solids content of the latex used was 45 percent of the total weight of latex. The coating was achieved with a No. 8 wire-wound Meyer rod. The latex coating was dried at 80° C. until clear. After dry a second coating was applied over the first coating in identical manner. The second coating was prepared by blending a latex prepared by the emulsion polymerization of 75 percent vinylidene chloride, 20 percent vinyl chloride, and 5 percent ethyl acrylate with a latex prepared by the emulsion polymerization of 89 percent vinylidene chloride and 11 percent acrylonitrile. Each latex contained 25 percent polymeric solids. The proportions used were 20 percent of the solids of the latex of the ternary polymer with 80 percent of the solids of the copolymer. Also added to the second coating was 1 percent of Triton X-100 and 4 percent on the latex solids of carnauba wax. The second coating was dried at 80° C. until clear. The combined coating thickness was 0.0001 inch. The result was a clear, glossy, flexible film.

The moisture vapor transmission of the coated film was compared with that of the uncoated film. The procedure used was that a sample of the film was stretched taut over a cup containing a weighed amount of calcium chloride. The opposite film surface was exposed to 90 percent relative humidity at 100° F. After a specified time the calcium chloride was reweighed. The increase in weight was taken as the amount of moisture that had passed through the film. Moisture vapor transmission is reported as the grams of water passing through 100 square inches of film in 24 hours. The coated film was found to have an MVT of about 2 gms./100 in.$^2$/24 hours. The uncoated films had an MVT of about 8 gms./100 in.$^2$/24 hours.

When the same uncoated film was coated with only the styrene-butadiene undercoat and tested there was found to be no improvement in moisture vapor transmission rate over the uncoated film. In addition this film when rolled exhibited severe adhesion and blocking and could not be easily unwound.

By way of further contrast when the film was coated with only the latex blend of vinylidene chloride copolymers, the coating was readily separated from the film using pressure sensitive tapes.

When the film was coated first with the styrene-butadiene latex then with the latex of the ternary polymer, the coated film blocked severely at below 60° C. In addition when the film was coated with the styrene-butadiene latex and then with the vinylidene chloride-acrylonitrile latex the top-coat could not be fused into a clear, satisfactory film below the heat distortion temperature of the polystyrene substratum.

What is claimed is:

1. A process for upgrading thermoplastic articles fabricated from the polymerizates of monoalkenyl aromatic monomers consisting of the sequential steps of (1) applying to at least one surface of said thermoplastic article a continuous uniform coating of a film-forming latex of a copolymer of a monoalkenyl aromatic monomer and a conjugated diolefin, (2) drying said coating to a clear coherent coating, (3) applying to the so-treated surface a continuous uniform coating of a film-forming dispersion of (a) from about 67 to 85 percent by weight of a first aqueous latex of a copolymer of vinylidene chloride and acrylonitrile and (b) from about 33 to 15 percent by weight of a second aqueous latex of a ternary polymer of vinylidene chloride, vinyl chloride and acrylonitrile and (4) drying said coating of step (3) to a clear coherent coating.

2. The process claimed in claim 1, wherein said article to be treated is a flexible film.

3. The process claimed in claim 2, wherein said flexible film is an oriented film of polystyrene.

4. The process claimed in claim 1, wherein said flexible film is coated on one surface.

5. The process claimed in claim 1, wherein said film-forming latex of step (1) is of a copolymer of styrene and butadiene composed of from about 20 to about 70 percent by weight of styrene.

6. The process claimed in claim 1, wherein said film-forming latex (b) of said step (3) is composed of at least 70 percent vinylidene chloride, not over 10 percent of an alkyl acrylate with the remainder being vinyl chloride.

7. The process claimed in claim 1, wherein each of said film-forming latexes of steps (1) and (3) contain at least 25 percent by weight of polymer solids.

8. The process claimed in claim 1, wherein said film-forming dispersion of said step (3) contains in addition to said latexes a wax having a melting point of at least 60° C. in an amount of not more than 4 percent of the weight of the solids of the latexes.

9. The process claimed in claim 8, wherein said wax is carnauba wax.

10. An article based on a substratum which has been fabricated of a monoalkenyl aromatic polymer, said article consisting of a first dried continuous coating in continuous adherent relationship to said substratum, said dried continuous coating consisting essentially of a copolymer of a monoalkenyl aromatic monomer and a conjugated diolefin and a second dried continuous coating in continuous adherent relationship to said first coating, said second coating consisting essentially of a homogeneous fused mixture of from 15 to 33 percent by weight of a ternary polymer of vinylidene chloride, vinyl chloride and an alkyl acrylate and from 85 to 67 percent by weight of a copolymer of vinylidene chloride and acrylonitrile.

11. The article claimed in claim 10, wherein said substratum is a flexible film.

12. The article claimed in claim 11, wherein said flexible film is multilaterally oriented.

13. The article claimed in claim 10, wherein said substratum is coated on one surface.

14. The article claimed in claim 10, wherein said first dried continuous coating is composed of a copolymer of styrene and butadiene containing from about 20 to about 70 percent by weight of styrene.

15. The article claimed in claim 10, wherein said ternary polymer is composed of at least 70 percent by weight of vinylidene chloride, of not over 10 percent of alkyl acrylate with the remainder made up of vinyl chloride.

16. The article claimed in claim 15, wherein said ternary polymer is composed of 75 percent by weight of vinylidene chloride, 20 percent by weight of vinyl chloride, and 5 percent by weight of ethyl acrylate.

17. The article claimed in claim 10, wherein said homogeneous fused mixture contains not more than 4 percent of the weight of said polymeric materials of said second coating of a wax having a melting point of at least 60° C.

18. The article claimed in claim 17, wherein said wax is carnauba wax.

References Cited in the file of this patent

UNITED STATES PATENTS

| Number | Name | Date |
|---|---|---|
| 2,801,936 | Bjorksten et al. | Aug. 6, 1957 |
| 2,819,984 | Ackerman | Jan. 14, 1958 |
| 2,819,985 | Cobbs | Jan. 14, 1958 |
| 2,824,024 | Chapman | Feb. 18, 1958 |
| 2,829,068 | Stewart | Apr. 1, 1958 |
| 2,829,069 | Michel | Apr. 1, 1958 |
| 2,930,106 | Wrotnowski | Mar. 29, 1960 |